(12) United States Patent
Tsingos et al.

(10) Patent No.: US 10,820,097 B2
(45) Date of Patent: Oct. 27, 2020

(54) METHOD, SYSTEMS AND APPARATUS FOR DETERMINING AUDIO REPRESENTATION(S) OF ONE OR MORE AUDIO SOURCES

(71) Applicant: Dolby Laboratories Licensing Corporation, San Francisco, CA (US)

(72) Inventors: Nicolas R. Tsingos, San Francisco, CA (US); Pradeep Kumar Govindaraju, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/337,923

(22) PCT Filed: Sep. 28, 2017

(86) PCT No.: PCT/US2017/053946
§ 371 (c)(1),
(2) Date: Mar. 29, 2019

(87) PCT Pub. No.: WO2018/064296
PCT Pub. Date: Apr. 5, 2018

(65) Prior Publication Data
US 2019/0230436 A1 Jul. 25, 2019

Related U.S. Application Data

(60) Provisional application No. 62/510,898, filed on May 25, 2017, provisional application No. 62/401,636, filed on Sep. 29, 2016.

(51) Int. Cl.
*H04R 3/00* (2006.01)
*G01S 5/20* (2006.01)
(Continued)

(52) U.S. Cl.
CPC .............. *H04R 3/005* (2013.01); *G01S 5/20* (2013.01); *G10L 25/18* (2013.01); *H04R 1/406* (2013.01);
(Continued)

(58) Field of Classification Search
CPC .............. H04R 3/005; H04R 2201/401; G10L 2021/02166
(Continued)

(56) References Cited

U.S. PATENT DOCUMENTS 6,130,949 A 10/2000 Aoki
8,712,059 B2 4/2014 Galdo
(Continued)

FOREIGN PATENT DOCUMENTS

WO 2004/077884 9/2004

OTHER PUBLICATIONS

Rolf, Bader. "Microphone Array", In: "Springer Handbook of Acoustics", Jan. 1, 2015, Springer, XP055428402, ISBN:978-1-4939-0754-0 pp. 1179-1207.
(Continued)

*Primary Examiner* — Alexander Krzystan (57) ABSTRACT

The present document describes a method (700) for determining the position of at least one audio source (200). The method (700) includes capturing (701) first and second microphone signals at two or more microphone arrays (210, 220, 230), wherein the two or more microphone arrays (210, 220, 230) are placed at different positions. The two or more microphone arrays (210, 220, 230) each comprise at least a first microphone capsule to capture a first microphone signal and a second microphone capsule to capture a second microphone signal, wherein the first and second microphone capsules have differently oriented spatial directivities. Furthermore, the method (700) comprises determining (702),
(Continued)

for each microphone array (210, 220, 230) and based on the respective first and second microphone signals, an incident direction (211, 221, 231) of at least one audio source (200) at the respective microphone array (210, 220, 230). In addition, the method (700) comprises determining (703) the position of the audio source (200) based on the incident directions (211, 221, 231) at the two or more microphone arrays (210, 220, 230).

17 Claims, 6 Drawing Sheets

(51) Int. Cl.
  *G10L 25/18* (2013.01)
  *H04R 1/40* (2006.01)
(52) U.S. Cl.
  CPC .... *H04R 2201/401* (2013.01); *H04R 2430/21* (2013.01); *H04S 2400/11* (2013.01); *H04S 2400/15* (2013.01); *H04S 2420/11* (2013.01)
(58) Field of Classification Search
  USPC .................................................. 381/92, 310
  See application file for complete search history.

(56) References Cited

U.S. PATENT DOCUMENTS

| 9,313,599 | B2 | 4/2016 | Tammi | |
| 9,396,731 | B2 | 7/2016 | Herre | |
| 9,420,372 | B2* | 8/2016 | Kordon | H04R 3/005 |
| 2008/0056517 | A1* | 3/2008 | Algazi | H04S 7/304 |
| | | | | 381/310 |
| 2008/0170718 | A1 | 7/2008 | Faller | |
| 2008/0199024 | A1 | 8/2008 | Nakadai | |
| 2008/0232601 | A1 | 9/2008 | Pulkki | |
| 2009/0012779 | A1 | 1/2009 | Ikeda | |
| 2013/0142341 | A1* | 6/2013 | Del Galdo | G10L 19/008 |
| | | | | 381/23 |
| 2014/0037210 | A1 | 2/2014 | Depalov | |
| 2015/0049892 | A1* | 2/2015 | Petersen | H04R 25/554 |
| | | | | 381/315 |
| 2016/0066086 | A1 | 3/2016 | Döbler | |
| 2018/0192186 | A1 | 7/2018 | Tsingos | |

OTHER PUBLICATIONS

Gallo, Emmanuel et al., "Extracting and Re-Rendering Structured Auditory Scenes from Field Recordings", Conference : 30th International Conference: Intelligent Audio Environments; Mar. 2007, AES, 60 East 42nd Street, Room 2520 New York USA, Mar. 1, 2007, XP040508005, the whole document.

Altman, M. et al "Immersive Audio for VR" presented at the Conference on Audio for Virtual and Augmented Reality, Sep. 30, 2016-Oct. 1, 2016, Los Angeles, CA, USA, pp. 1-8.

* cited by examiner

METHOD, SYSTEMS AND APPARATUS FOR DETERMINING AUDIO REPRESENTATION(S) OF ONE OR MORE AUDIO SOURCES

CROSS-REFERENCE TO RELATED APPLICATIONS

This application claims the benefit of priority to U.S. Provisional Patent Application No. 62/510,898, filed May 25, 2017, and to U.S. Provisional Patent Application No. 62/401,636, filed Sep. 29, 2016, both of which are hereby incorporated by reference in their entirety.

TECHNICAL FIELD

The present disclosure relates to volumetric audio capture, modeling and representation and methods, apparatuses and processes which provide a volumetric audio representation, including position and/or audio characteristics, of one or more audio objects.

BACKGROUND

Virtual reality (VR), augmented reality (AR) and mixed reality (MR) applications are rapidly evolving to include increasingly refined acoustical models of sound sources and scenes that can be enjoyed from different viewpoints/perspectives. Two different classes of flexible audio representations may be employed for VR applications: sound-field representations and object-based representations. Sound-field representations are physically-based approaches that encode the incident wavefront at the listener location. For example, approaches such as B-format or Higher-Order Ambisonics (HOA) represent the spatial wavefront using a spherical harmonics decomposition. Object-based approaches represent a complex auditory scene as a collection of singular elements comprising an audio waveform and associated parameters or metadata, possibly time-varying.

Figure 1:
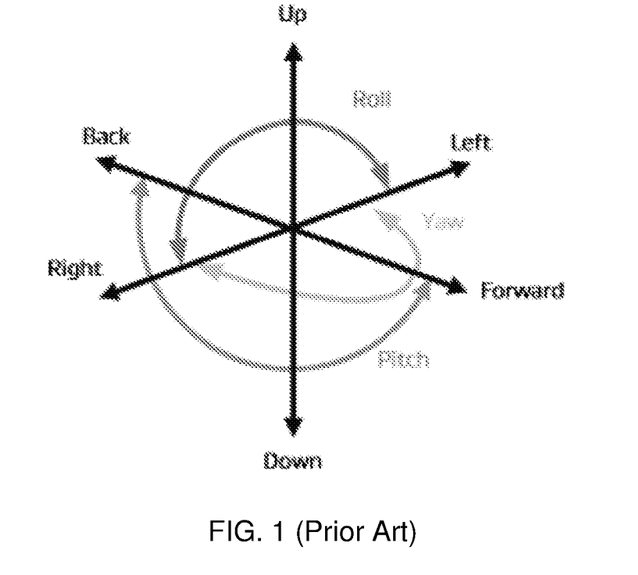
FIG. 1 illustrates an exemplary 6 degree of freedom (DOF) room-based VR including translational movement (forward/back, up/down and left/right) and rotational movement (pitch, yaw and roll)

Enjoying VR, AR and MR applications may include experiencing different auditory viewpoints or perspectives by the user. For example, room-based VR may be provided based on a mechanism using 6 degrees of freedom (DOF). FIG. 1 illustrates an example of 6 DOF interaction which shows translational movement (forward/back, up/down and left/right) and rotational movement (pitch, yaw and roll). Unlike a 3 DOF spherical video experience that is limited to head rotations, content created for 6 DOF interaction also allows for navigation of a virtual environment (e.g., physically walking inside a room), in addition to the head rotations. This can be accomplished based on positional trackers (e.g., camera based) and orientational trackers (e.g. gyroscopes and/or accelerometers). 6 DOF tracking technology may be available on higher-end desktop VR systems (e.g., PlayStation® VR, Oculus Rift, HTC Vive) as well as on high-end mobile VR platforms (e.g., Google Tango). A user's experience of directionality and spatial extent of sound or audio sources is critical to the realism of 6 DOF experiences, particularly an experience of navigation through a scene and around virtual audio sources.

Although there are visual techniques that allow for the reconstruction of 3D scenes from multiple cameras (e.g., based on photogrammetry) allowing the interaction with volumetric 3D models, there is a lack of audio solutions that can match these volumetric video approaches. For example, sound field capture, modeling and reconstruction (e.g. wave field synthesis (WFS) or higher order ambisonics (HOA)) are currently limited with respect to providing compelling 6 DOF interaction over relatively large areas and with directional behavior. To achieve good reconstruction over a relatively large area or a relatively wide frequency range, a relatively large number of monophonic microphones is required. As a result, such approaches suffer from the quality or SNR of individual microphone capsules. Furthermore, while monophonic microphones can capture audio scene information, the lack of spatial information at each point makes it challenging to fuse the different recordings into a coherent audio scene.

SUMMARY

The present document addresses the technical problem of determining a volumetric audio representation of an audio scene comprising one or more audio sources in an efficient and precise manner.

According to an aspect, a method for determining the position of at least one audio source is described. The method includes receiving first and second microphone signals at two or more microphone arrays, wherein the two or more microphone arrays are placed at different positions (e.g., at different positions around the at least one audio source). The two or more microphone arrays each comprise at least a first microphone capsule to capture a first microphone signal and a second microphone capsule to capture a second microphone signal, wherein the first and second microphone capsules have differently oriented spatial directivities. Furthermore, the method includes determining, for each microphone array and based on the respective first and second microphone signals, an incident direction of at least one audio source at the respective microphone array. In addition, the method includes determining the position of the audio source based on the incident directions at the two or more microphone arrays.

According to a further aspect, a method for determining the position of at least one audio source is described. The method is adapted to capture first and second microphone signals at two or more microphone arrays, wherein the two or more microphone arrays are placed at different positions. The two or more microphone arrays each comprise at least a first microphone capsule to capture a first microphone signal and a second microphone capsule to capture a second microphone signal, wherein the first and second microphone capsules have differently oriented spatial directivities. The method is further adapted to determine, for each microphone array and based on the respective first and second microphone signals, an incident direction of at least one audio source at the respective microphone array. In addition, the method is adapted to determine the position of the audio source based on the incident directions at the two or more microphone arrays.

The method is further adapted to determine a core mono audio signal and construct a spherical harmonic representation of audio directivity based on the position of the audio source. The method may further determine an audio representation based on the position of the audio source, the core mono signal and the spherical harmonic representation of the audio directivity.

According to a further aspect, a system is described that may perform the method outlined above.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein.

DETAILED DESCRIPTION

As will be appreciated by those skilled in the art, complete immersion in a virtual world "tricks" one's brain into believing what is sensed. When sight is limited by the field of view, sound adds dimension for what may not visible. For example, sound may indicate when a bull is charging from behind, a rattlesnake is moving to the right, or even when a whisper moves from ones left ear, to behind their head and then to the right ear. By leveraging sound to direct a user's gaze, content creators can more effectively tell a story.

Immersive audio experiences are now being delivered in Cinema and Home Theatre through object based sound creation, packaging and playback of content. This has paved the way for VR sound that necessitates sound precision for complete immersion in a virtual world. Creators of VR content require the capability to create object-based sound in a three dimensional space. Moreover, such content needs to be encoded, delivered, decoded and rendered binaurally (on headphones) and over speakers with the precision and efficiency that allows a user to enjoy the content. It is commonly assumed that good VR audio content can be achieved by direct capture that matches a camera perspective. However, crafting a compelling mix generally requires stepping beyond reality to offer an enhanced perspective on the action. The required artistic intent and creative integrity must be preserved from content creation to consumption, ensuring full immersion into the virtual world.

Example embodiments described herein describe methods, apparatuses and processes which are adapted to record an audio scene with a relatively small number of (high quality, low order) directional microphone arrays (e.g., stereo XY, XY+omni or A-format microphones) and reconstruct a volumetric audio representation that estimates positions and audio characteristics of one or more audio objects (i.e., of one or more audio sources emitting audio signals from one or more positions). The audio characteristic includes, for example, the audio signal of an audio source, the directional characteristics of the audio signal and/or a direct/diffuse metadata identifier for the audio signal.

Additional example embodiments described herein propose an efficient solution to encode and spatially code directional audio sources by extending parametric object audio encoding and spatial clustering approaches to include directional information. Example embodiments disclosed herein can employ various capture techniques. For example, in one example embodiment VR, AR and/or MR environments may be created by merging multiple single point directional recordings (e.g. stereo, B-format, HOA) into a single 3D audio scene.

Figure 6:
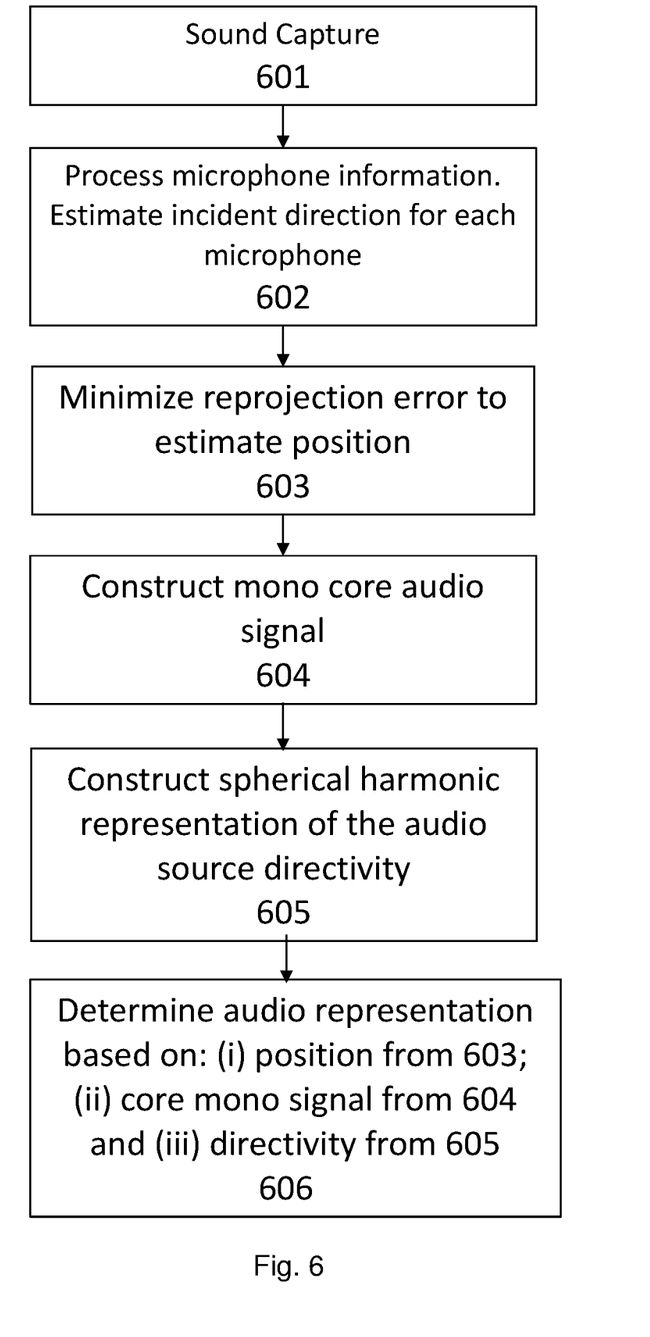
FIG. 6 illustrates a flow chart of an exemplary method for determining volumetric audio representation(s)

FIG. 6 illustrates an exemplary method 600 for determination of a volumetric audio representation. At 601, sound may be captured by one or more microphones or microphone arrays. Alternatively, at 601, pre-captured sound may be received by method 600. The sound may be represented by audio signals, and, additionally, one or more microphone poses (i.e., microphone position and orientation data).

The microphone poses may be captured based on computer vision techniques or sensors (e.g., gyroscopes, structured light sensors, etc.) or through acoustical measurement based on a planar arrangement of audio sources (e.g., small loudspeakers), wherein the geometry of the audio sources is known a priori. For example, microphone poses may be captured by way of trackers available in higher-end VR systems (e.g., PlayStation® VR, Oculus VR, Oculus Rift, HTC Vive) as well as on mobile VR platforms (e.g., Google Tango). The microphones or microphone arrays may be or may include directional microphones (e.g., XY microphones or B-format microphones).

Alternatively, microphone poses may further be obtained acoustically based on a time difference of arrival (TDOA) analysis. For example, the position may be recovered by solving a set of non-linear equations linking the microphone positions to the TDOA (i.e the inter-microphone distance) between all microphone pairs. Directional tracking may recover the orientation of a microphone. Alternatively or in addition, the microphone pose may be determined based on spatial audio sources with known geometry. The pose of each of the plurality of microphones or microphone arrays may be determined one by one or all in one pass. In one example, the sound may be captured at 601 in accordance with the principles described in connection with method 700 of FIG. 7, such as, for example block 701 of FIG. 7.

At 602, captured microphone information (i.e. microphone signals) may be processed. For example, at 602, noise reduction and time alignment may be performed based for the captured microphone information, such as all captured microphone inputs (i.e. on one or more sets of microphone signals). An input may depend on the microphone pose of the corresponding microphone array. Spatial analysis may be employed on one or more sets of microphone signals (also referred to microphone channels). The direct/diffuse components and principal direction(s) of incidence may be determined for different frequency subbands (e.g., time/frequency tiles), for instance using the XY upconversion method described in Determining Azimuth and Elevation Angles from Stereo Recordings, filed as PCT/US2016/040836. Additional source separation approaches or signal classification may also be used as to not be limited to subband analysis.

For example, during an XY upconversion technique, a pair of coincident, vertically-stacked directional microphone capsules may output first and second microphone audio signals. The pair of microphone capsules (forming a microphone array) may be configured such that the pair of coincident, vertically-stacked directional microphone capsules is an XY stereo microphone system. Some methods may involve receiving input audio data including first microphone audio signals and second microphone audio signals output by a pair of coincident, vertically-stacked directional microphone capsules. An azimuthal angle corresponding to a sound source location may be determined, based at least in part on an intensity-difference between the first microphone audio signals and the second microphone audio signals. An elevation angle can be estimated from the time-difference between the two microphone audio signals. An estimation of the 3D direction of incidence (also referred to herein as incidence direction) of the sound captured by a microphone array may be determined based on the azimuth and elevation information. This process may be performed for different frequency subbands and/or separate audio sources or audio components.

Wide-band time alignment may be implemented, across all frequencies, relative to all inputs. Spatial averaging may be performed on each subband of direct sound after the upmixing/direction estimation. In one example, the sound may be processed in accordance with the principles described in connection with method 700 of FIG. 7, such as, for example block 702 of FIG. 7.

Figure 2:
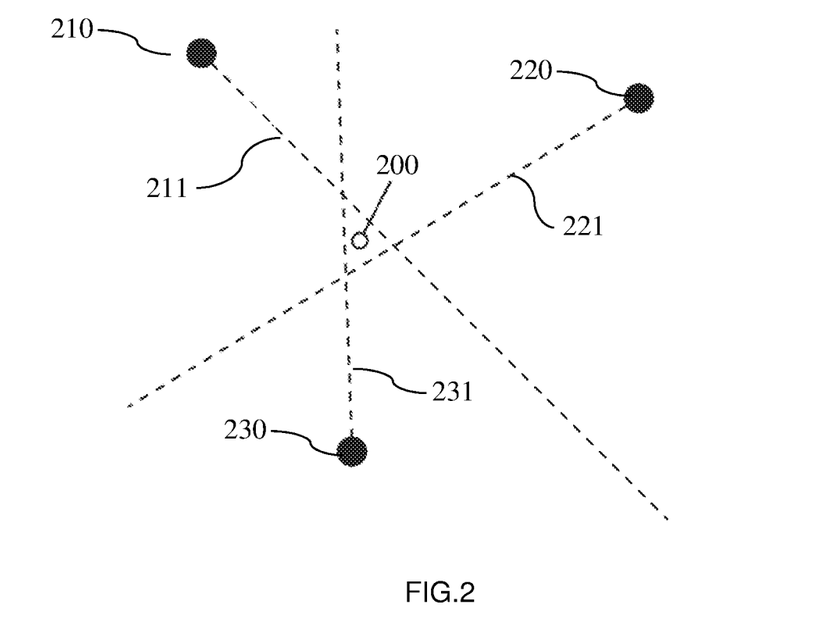
FIG. 2 illustrates a diagram of a plurality of microphone arrays used for capturing the audio signals emitted by one or more audio sources.

At 603, using the known poses of the microphone arrays, the reprojected position of each subband audio source into each microphone "point of view" may be determined based on the incident direction estimated from each microphone array (for each subband and/or for each separate audio component). An example is illustrated in FIG. 2. For example, an estimated position for each audio source 200 (e.g. each subband) may be determined, such as, for example, using a gradient descent to obtain position estimates by minimizing a cost function representing the reprojection error of the position estimates of each microphone array 210, 220, 230. FIG. 2 illustrates a diagram of a plurality of microphone arrays 210, 220, 230 with an estimated direction 211, 221, 231 and an estimated position of an audio source 200, in accordance with example embodiments disclosed herein. In one example, the position may be determined in accordance with the principles described in connection with method 700 of FIG. 7, such as, for example block 703 of FIG. 7 or method 600 of FIG. 6, such as for example block 603 of FIG. 6.

At 604, a monophonic core signal (i.e. an audio signal) may be reconstructed for each audio source 200 (e.g. for each subband). This core signal or audio signal may be determined based on an approximation of the original signal emitted by an audio source 200 into the environment. For example, the mono core signal may be determined based on a linear combination of the microphone audio signals (e.g., a sum weighted by the distance between the estimated source position and each microphone position). More generally, the monophonic core signal (i.e. the audio signal) of an audio source 200 may be determined as a weighted average of all the microphone signals captured by the plurality of microphone arrays 210, 220, 230. The weights for determining the weighted average may be determined based on a function of the relative position of the microphone arrays 210, 220, 230 and the estimated position of the audio source 200.

Figure 3:
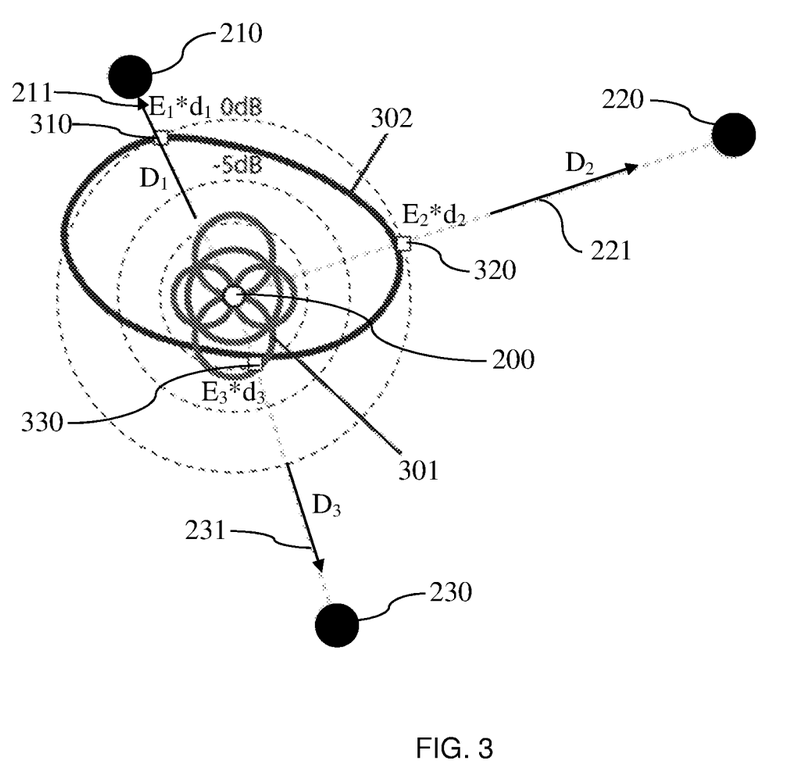
FIG. 3 illustrates an example directivity pattern of an audio source.

At 605, a spherical harmonic representation of the audio signal of an audio source 200 may be further optimally constructed. A directional "residual" signal for each audio source 200 (e.g. for each subband) may be determined. This information can be determined based on a difference between the energy of the monophonic audio signal reconstructed at 604 and the energy of the microphone signals captured by the plurality of microphone arrays 210, 220, 230. Knowing the microphones poses and the estimated positions of each audio source 200 (e.g. each subband or separated audio component), a directivity pattern 302, such as that shown in FIG. 3, may be determined (e.g., for each audio source 200) by fitting a set of spherical harmonic coefficients to the energy levels recorded by each microphone. FIG. 3 illustrates a simulation of a fitted directivity pattern 302 for a plurality of microphone arrays 210, 220, 230 overlaying a plurality of fitted spherical harmonic components 301 in accordance with example embodiments disclosed herein. This directivity pattern 302 may be encoded as Decibel (dB) deltas relative to the omnidirectional/average audio signal determined at 604. In one example, the processing at 605 may be performed in accordance with the principles described in connection with method 800 shown in FIG. 8.

At 606, an audio representation is determined based on the information from 603, 604 and 605. More specifically, the audio representation may be determined based on (i) the positions output from 603, (ii) the core audio signal from 604, and (iii) the directivity function output from 605. Those elements can be estimated for different subbands as previously mentioned. The audio representation can then be output and transmitted for further processing, (e.g., by method 900 shown in FIG. 9), such as for re-rendering to a novel listening vantage point.

Example embodiments disclosed herein can also employ various tools and GUIs which can among other things combine upmixing, automated fusion and manual mixing by linking/unlinking inputs, generate an object audio output (while keeping direct/diffuse components separated), adjust direct/diffuse component gains as a function of listener distance (prior to encoding or after encoding). GUI elements may include moving a listener, moving an audio source 200, as well as changing between an input and a world view.

Example embodiments are directed at the encoding and delivery by way of parametrical encoding and decoding of directional sound objects or by way of dynamically grouping directional sources into a representative directional cluster with a representative position, such as new omni-directional signals and new directional directivity deltas.

Enumerated examples of the present document are:

Enumerated Example 1

A volumetric audio capture, representation and encoding method comprising: capturing or determining one or more microphone poses from one or more microphones to simulate audio information with respect to a directionality of the one or more microphone poses; minimizing a reprojected position of subband audio objects from directional estimates obtained from each microphone "point of view"; approximating the 3D position of the physical sound sources in the recorded scene; and reconstructing a mono core and a directional residual signal for each subband object approximating the signal emitted by the physical sound sources in the recorded scene.

Enumerated Example 2

The method of enumerated example 1, wherein the capturing one or more microphone poses comprises the use of positional trackers or audio analysis based on a known source geometry.

Enumerated Example 3

The method of enumerated example 1, wherein the spatial analysis is employed on one or more sets of microphone input channels by recovering direct/diffuse components and principal direction(s) of incidence for different frequency subbands.

Enumerated Example 4

The method of enumerated example 1, wherein a source separation approach is employed in combination with the capturing of one or more microphone inputs by way of spatial analysis which is not limited to subband analysis.

Enumerated Example 5

The method of enumerated example 1, wherein estimating the sources 3D position employs a gradient descent to obtain positional estimates.

Enumerated Example 6

The method of enumerated example 1, wherein reconstructing the mono core plus directional residual signal for each subband objects employs a linear combination of microphone signals based on estimated source distance/direction relative to each one or more microphone.

Enumerated Example 7

The method of enumerated example 5, wherein reconstructing the mono core plus directional residual signal for each subband objects includes optimizing a spherical harmonic representation for each subband object.

Enumerated Example 8

The method of enumerated example 6, wherein directivity is encoded as Decibel (dB) deltas relative to an omni/average source.

Enumerated Example 9

The method of enumerated example 6, further comprising the steps of: converting high order spatial harmonics to a sum of sparse cosine lobes; and decoding core omni and directional residual as function of object importance.

Enumerated Example 10

The method of enumerated example 1, wherein an approximation of an object signal is reconstructed in a number of subband objects by weighted/time aligned sum of all the microphones based on the estimated distance of each subband object to each direct microphone signal having discarded some estimate of the diffuse component.

Enumerated Example 11

The method of enumerated example 1, wherein a non-transitory computer-readable medium with instructions stored thereon that when executed by one or more processors perform a method described in the present document.

Enumerated Example 12

An apparatus configured for volumetric audio capture, representation and encoding, comprising: at least one processor and at least one memory configured to: capture one or more microphone poses from one or more microphones to simulate information with respect to a directionality of the one or more microphone poses; minimize a reprojected position of subbands objects corresponding to each microphone "point of view"; and reconstruct a mono core plus directional residual signal for each subband objects.

Figure 7:
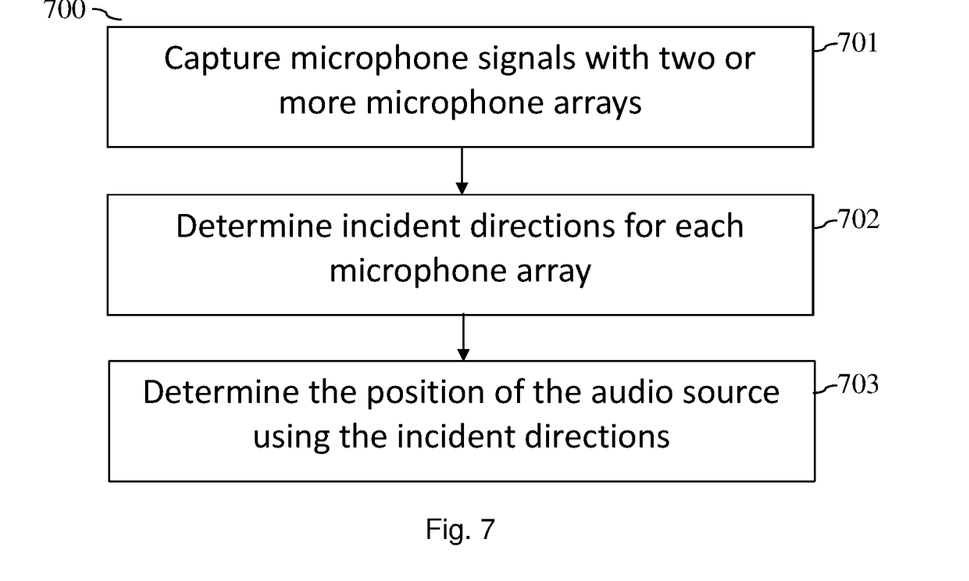
FIG. 7 shows a flow chart of an exemplary method for determining a position of an audio source.

FIG. 7 shows a flow chart of an example method 700 for determining the position of at least one audio source (e.g., audio source 200). In one example, the method 700 may include processing performed in connection with blocks 602 and 603 of method 600 shown in FIG. 6 The method 700 may be directed at determining an audio signal emitted by the at least one audio source 200. In addition, the method 700 may be directed at generating an audio representation that is independent from the listener position, i.e., can be re-rendered for a listener positioned at an arbitrary listening position. In particular, an audio representation of the audio signal emitted by the at least one audio source 200 may be generated.

This audio representation can be used by method 900 to render listening signals at different listening positions, wherein listening signals are indicative of how a listener perceives the audio signal emitted by the at least one audio source 200 at the different listening positions. For being able to generate such listening signals, the audio representation (i.e. the position, the emitted audio signal and/or the directivity pattern 302 of one or more audio sources 200) may be determined based on the methods 600, 700 or 800 described in the present document.

The method 700 may include, at 701, capturing first and second microphone signals at two or more microphone arrays 210, 220, 230, wherein the two or more microphone arrays 210, 220, 230 are placed at different positions. In other words, two or more microphone arrays 210, 220, 230 (e.g., three or more microphone arrays 210, 220, 230) may be placed at different positions within a three-dimensional environment. Although the present method illustrates three microphone arrays, more than three microphone arrays may be implemented. The microphone arrays 210, 220, 230 may be placed around the one or more audio sources 200. Each of the microphone arrays 210, 220, 230 may capture a first microphone signal and a second microphone signal, wherein the microphone signals of a microphone array 210, 220, 230 are indicative on how an audio signal emitted by an audio source 200 is perceived at the position of the microphone array 210, 220, 230.

The two or more microphone arrays 210, 220, 230 typically comprise each at least a first microphone capsule for capturing a first microphone signal and a second microphone capsule for capturing a second microphone signal. The first and second microphone capsules typically have different orientations. In other words, the first and second microphone capsules may be configured to capture sound in different spatial directions or with a different directivity. By way of example, a microphone array (e.g., 210, 220, 230) may comprise or may be an XY microphone array comprising a first microphone capsule and a second microphone capsule, wherein the microphone capsules are configured to capture sound at different angles (e.g., at an angle of 90° with respect to one another). Alternatively or in addition, a microphone array 210, 220, 230 may comprise a soundfield microphone (e.g., a B-format microphone).

As such, the first microphone signal and the second microphone signal of a microphone array 210, 220, 230 are indicative of different perspectives of an audio signal emitted by the at least one audio source 200. The different perspectives may be at a 90° angle with respect to one another. The different perspectives may be used to determine the incident direction 211, 221, 231 of the audio signal emitted by the at least one audio source 200 at a microphone array 210, 220, 230.

A microphone array 210, 220, 230 may be such that the position of the two or more microphone capsules of the microphone array 210, 220, 230 is substantially the same for the two or more microphone capsules of the microphone array 210, 220, 230. On the other hand, the orientation of the spatial directivity of the microphone capsules of a microphone array 210, 220, 230 may be substantially different. As a result of this, the processing for determining the incident direction 211, 221, 231 of the audio signal emitted by an audio source 200 may be simplified.

The position and the orientations of spatial directivities of a microphone array 210, 220, 230 may be known in advance (e.g. through the design of a system comprising the plurality of microphone arrays 210, 220, 230). Alternatively, the method 700 may include determining the position of a microphone array 210, 220, 230 e.g. using image processing, e.g. using a position sensor fixed at the microphone array 210, 220, 230 and/or e.g. using IR (infrared) tracking. Furthermore, the method 700 may comprise determining an orientation of a microphone array 210, 220, 230 (i.e. the orientations of spatial directivities of the different microphone capsules), (e.g., using an orientation sensor). The incident direction 211, 221, 231 of the audio signal emitted by an audio source 200 at the microphone array 210, 220, 230 may then be determined based on the position and/or the orientation of the microphone array 210, 220, 230.

As such, the method 700 may include, at 702, determining, for each microphone array 210, 220, 230 and based on the respective first and second microphone signals, the incident direction 211, 221, 231 of the at least one audio source 200 at the respective microphone array 210, 220, 230. In particular, the incident direction 211, 221, 231 of the audio signal emitted by an audio source 200 at a microphone array 210, 220, 230 may be determined based on the first and second microphone signals that are captured by the microphone array 210, 220, 230. The incident direction 211, 221, 231 may be determined by processing the first and second microphone signals. In particular, level and/or phase differences of the first and second microphone signals (i.e. interchannel level and/or phase/time differences) may be used to determine the incident direction 211, 221, 231.

The incident direction 211, 221, 231 of an audio source 200 (or of the audio signal emitted by an audio source 200) at a microphone array 210, 220, 230 may be indicative of the direction from which the audio signal arrives at the position of the microphone array 210, 220, 230. Using two or more (e.g., three or more) microphone arrays 210, 220, 230 two or more (e.g., three or more) incident directions 211, 221, 231 may be determined for an audio source 200. In other words, K microphone arrays 210, 220, 230, with K being an integer with K>1 (e.g., K>2), may be used. The K microphone arrays 210, 220, 230 may each be adapted to capture first and second microphone signals indicative of the audio signal emitted by an audio source 200, thereby providing K sets of first and second microphone signals. Using a set of first and second microphone signals, an incident direction 211, 221, 231 may be determined. Hence, K incident directions 211, 221, 231 for the K microphone arrays 210, 220, 230 may be determined for a single audio source 200.

The method 700 may further comprise, at 703, determining the position of the audio source 200 based on the incident directions 211, 221, 231 at the two or more microphone arrays 210, 220, 230. In other words, the K incident directions 211, 221, 231 for the K microphone arrays 210, 220, 230 may be used to determine the position of an audio source 200. For this purpose, it may be exploited that the audio signal which is emitted by an audio source 200 is typically emitted from a single position (i.e. from the position of the audio source 200). As a result of this, the K incident directions 211, 221, 231 at the K positions of the K microphone arrays 210, 220, 230 should be correlated with one another. The K incident directions 211, 221, 231 should point to the unique position of the audio source 200. By way of example, triangulation techniques may be used to determine this unique position of the audio source 200 from the K incident directions 211, 221, 231.

Using the method 700 of FIG. 7, the position of an audio source 200 may be determined in an efficient and precise manner. In particular, only a relative low number of (directional) microphone arrays 210, 220, 230 (e.g. K=3) is required for capturing the sound emitted by an audio source 200. The microphone signals captured by the (relatively low number of) microphone arrays 210, 220, 230 may then be used to determine the position of an audio source 200 in a precise manner.

As indicated above, the K incident directions 211, 221, 231 of an audio source 200 should point to the position of the audio source 200. This is illustrated in FIG. 2. An incident direction 211, 221, 231 at a microphone array 210, 220, 230 is indicative of a straight line or a ray which originates at the position of the microphone array 210, 220, 230 and which points (roughly) in the direction of the position of the audio source 200. At 703, for determining the position of an audio source 200, a cost function may be reduced or minimized. The cost function may be indicative of an average distance, (e.g., of an average squared distance), of the (to be determined) position of the audio source 200 from the K straight lines originating from the K positions of the K microphone arrays 210, 220, 230, wherein the K straight lines are oriented in accordance to the K incident directions 211, 221, 231, respectively. In other words, the cost function may be indicative of the (average) reprojection error of the (to be determined) position of the audio source 200 onto the previously determined K incident directions 211, 221, 231. As such, a position of the audio source 200 may be determined which is closest (in average, with respect to a certain distance measure, e.g. a mean squared distance or a mean absolute distance) from the K straight lines defined by the K incident directions 211, 221, 231 and defined by the K positions (or poses) of the K microphone arrays 210, 220, 230, respectively. By doing this, the position of an audio source 200 may be determined in a precise manner.

The method 700 may include determining an inter-channel level difference (ICLD) and an inter-channel time difference (ICTD) based on the first microphone signal and based on the second microphone signal of a microphone array 210, 220, 230. In one example, the ICLD and/or the ICTD may be determined or received at 702 of method 700 shown in FIG. 7. The ICLD may be indicative of a difference in level and/or energy of the first microphone signal and the second microphone signal. The ICTD may be indicative of a phase difference between a phase of the first microphone signal and a phase of the second microphone signal. In other words, the ICTD may be indicative of a time-of-arrival difference between the time-of-arrival of the first microphone signal and the time-of-arrival of the second microphone signal. The incident direction 211, 221, 231 at a microphone array 210, 220, 230 may then be determined based on the inter-channel level difference and based on the inter-channel time difference. By doing this, the incident directions 211, 221, 231 may be determined in a precise manner, thereby improving the precision of the determined position of an audio source 200.

An incident direction 211, 221, 231 at a microphone array 210, 220, 230 may be indicative of an azimuth angle and of an elevation angle within a three-dimensional environment. The angles may be defined relative to the position of the microphone array 210, 220, 230 and/or relative to an orientation of the microphone array 210, 220, 230, (i.e., relative to the pose of the microphone array 210, 220, 230). In other words, the incident direction 211, 221, 231 at a microphone array 210, 220, 230 may be indicative of an azimuth angle 411 and of an elevation angle 412 of a straight line originating at the position of the microphone array 210, 220, 230 and pointing towards an estimated position of the audio source 200.

Figure 4:
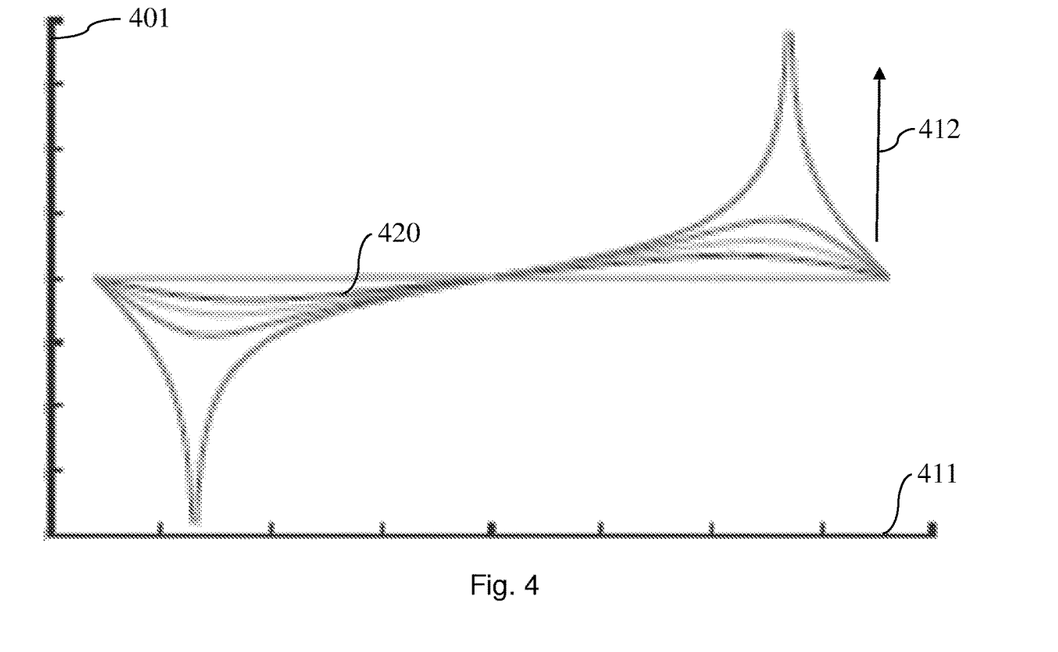
FIG. 4 shows an example functional relationship between the inter-channel characteristics of an audio signal captured at a microphone array and the directional parameters of an audio source.

FIG. 4 shows example functional relations 420 that may be used to determine the azimuth angle 411 and the elevation angle 412 of an incident direction 211, 221, 231 based on the inter-channel level difference 401 and/or based on the inter-channel time difference. By way of example, the azimuth angle 411 may be determined based on the inter-channel level difference (ICLD) 401. For this purpose, it may be assumed that the first and second microphone signals are captured within a plane and that the azimuth angle 411 indicates the angle of the incident direction 211, 221, 231 within this plane. On the other hand, the elevation angle 412 may be determined based on the inter-channel time difference. As can be seen from FIG. 4, the functional relation 420 between the azimuth angle 411 and the ICLD 401 typically also depends on the elevation angle 412. As such, it may be beneficial to determine the pair of elevation angle 412 and azimuth angle 411 for an incident direction 211, 221, 231 from a the pair of ICLD 401 and ICTD, thereby enabling a precise determination of the incident directions 211, 221, 231 at the plurality of microphone arrays 210, 220, 230.

Figure 5:
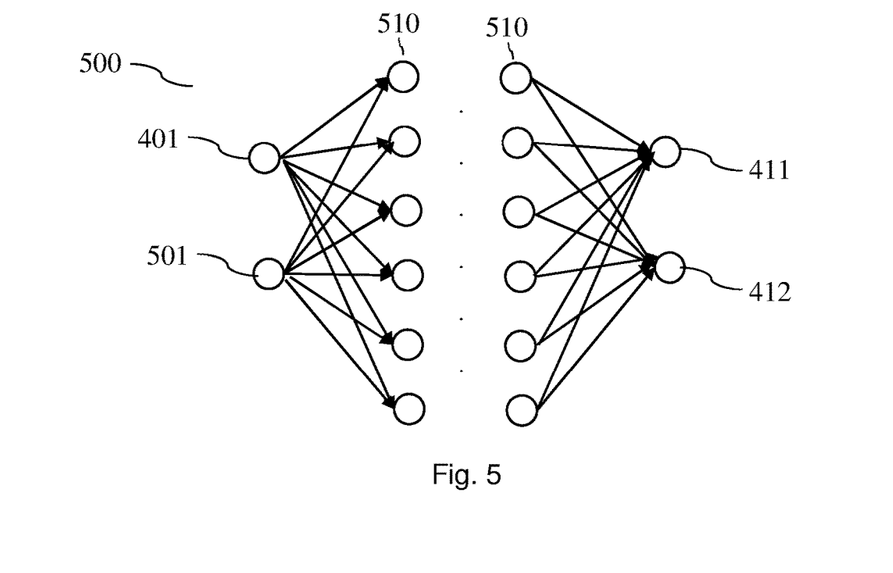
FIG. 5 shows an example neural network for deriving the directional parameters of an audio source from the inter-channel characteristics of microphone signals captured at a microphone array.

The incident direction 211, 221, 231 at a microphone array 210, 220, 230 may be determined based on the first microphone signal and based on the second microphone signal of the microphone array 210, 220, 230 using a classifier 500, wherein the classifier 500 may include or may be a machine-learned classifier, (e.g., a neural network). By making use of a classifier (e.g., a machine-learned classifier) the incident directions 211, 221, 231 may be determined in a precise manner.

The classifier 500 may be configured to map the inter-channel level difference 401 and the inter-channel time difference 501 derived from the first microphone signal and the second microphone signal of a microphone array 210, 220, 230 to the incident direction 211, 221, 231 at the microphone array 210, 220, 230, notably to the azimuth angle 411 and the elevation angle 412. FIG. 5 shows an example classifier 500, notably a neural network with a plurality of hidden layers 510. The input layer of the neural network shown in FIG. 5 is used to input a set of ICLD 401 and ICTD 501 and the output layer of the neural network is used to provide the corresponding set of azimuth angle 411 and elevation angle 412. The neural network may be a feedforward neural network. The number of hidden layers 510 may be 1, 2, 3 or more (e.g. 4). The different neurons of the neural network may make use of the same type or of different types of activation functions. In particular, tan-sigmoid functions may be used as activation functions. The weights and bias values of the activation functions may be trained using training data (e.g. using the Levenberg-Marquardt algorithm).

The method 700 may include determining direct components and indirect components from the first microphone signal and from the second microphone signal of a microphone array 210, 220, 230. In one example, at 702 of method 700 shown in FIG. 7, the direct and indirect components may be utilized to determine incident directions for each microphone array. In particular, a first direct component of the first microphone signal and a second direct component of the second microphone signal may be determined. The direct components may be determined based on the correlation between the first microphone signal and the second microphone signal. The direct components of the first and second microphone signals may be indicative of the directly received audio signal emitted from the audio source (without considering reflections of the emitted audio signal and without considering surrounding noise). The incident direction 211, 221, 231 at a microphone array 210, 220, 230 may then be determined based on the direct components, notably based on the first direct component and the second direct component, of the microphone signals captured at the microphone array 210, 220, 230. By extracting direct components from the first and second microphone signals of a microphone array 210, 220, 230, the incident direction 211, 221, 231 at the microphone array 210, 220, 230 may be determined with increased precision.

The method 700 may include determining N first subband signals from the first microphone signal of a microphone array 210, 220, 230, with N being an integer with N>1 (notably N>5, 10, e.g. N=13). The N subband signals may be determined at 702 of method 700 shown in FIG. 7. Furthermore, N second subband signals may be determined from the second microphone signal of the microphone array 210, 220, 230. The N first and second subband signals correspond to N different subranges of an overall frequency range of the first and second microphone signals. As such, the microphone signals of a microphone 210, 220, 230 may be subdivided into N subband signals, respectively, wherein the N subband signals cover different frequency ranges of the microphone signals. In one example, the overall frequency range may range from 0 Hz to 24 kHz. The subband signals may be determined using a time domain to frequency domain transform, such as a Fast Fourier Transform (FFT) or a filter-bank.

The N different subbands may be considered to correspond to N different audio sources 200. As such, at a microphone array 210, 220, 230 N incident directions 211, 221, 231 of N different audio sources 200 may be determined based on the N first and second subband signals, respectively. In other words, it may be assumed that N different audio signals which are emitted by N different audio sources 200 are arriving at a microphone array 210, 220, 230. The N incident directions 211, 221, 231 of the N audio signals emitted by the N audio sources 200 may then be determined based on the N first and second subband signals, respectively. Using respective incident directions 211, 221, 231 for the respective subbands at the K different microphone arrays 210, 220, 230, the N positions of the N different audio sources 200 may be determined in a precise manner.

As such, by using subband processing, different audio sources 200 may be identified in a precise manner. For this purpose, the processing described in the present document may be performed based on the first and second subband signals of separate subbands. In other words, the processing which is described in the present document for a set of first and second microphone signals may be replaced by processing which is performed on separate sets of first and second subband signals.

A directivity pattern 302 of an audio source 200 may be determined based on the first and second microphone signals (or based on the first and second subband signals derived from the first and second microphone signals) of the two or more (i.e. of the K) microphone arrays 210, 220, 230. The directivity pattern 302 of an audio source 200 may indicate the spatial directivity of the audio signal which is emitted by the audio source 200. The directivity pattern 302 may be determined by method 800 shown in FIG. 8.

Typically, the sound pressure level of an audio source 200 decreases proportionally with the distance d from the audio source 200. Based on the position of the audio source 200 and the positions of the K microphone arrays 210, 220, 230, the K distances $d_k$, k=1, . . . , K, between the K microphone arrays 210, 220, 230 and the audio source 200 may be determined. Using the microphone signals captured by the K microphone arrays 210, 220, 230 K sound pressure levels $E_k$ may be determined for the audio source 200. The sound pressure level $E_k$ for the $k^{th}$ microphone array 210, 220, 230 may be considered to be proportional to the sound pressure level $S_k$ of the sound emitted by the audio source 200 in the direction $D_k$ 211, 221, 231 of the $k^{th}$ microphone array 210, 220, 230, wherein the proportionality factor corresponds to the distance $d_k$ of the $k^{th}$ microphone array 210, 220, 230 from the audio source 200. Hence, the sound pressure level $S_k$ of the audio source 200 in the direction $D_k$ 211, 221, 231 of the $k^{th}$ microphone array 210, 220, 230 may be determined as $S_k=E_k*d_k$.

The sound pressure levels $S_k$, k=1, . . . , K, for the K directions $D_k$ 211, 221, 231 of the K microphone arrays 210, 220, 230 may be normalized. By way of example, the sound pressure levels $S_k$ may be normalized using an average of the sound pressure levels $S_k$, k=1, . . . , K. As will be outlined below, it may be beneficial to assign the microphone signals of a single one of the K microphone arrays 210, 220, 230 to be the mono audio signal of the audio source 200. By way of example, the microphone signals of the first microphone array 210, 220, 230 may be assigned to be the mono audio signal of the audio source 200. As such, it may be preferable to normalize the sound pressure levels $S_k$, k=1, . . . , K by $S_1$, by the sound pressure level of the first microphone array 210, 220, 230, e.g., as $g_k=S_k/S_1$, for k=1, . . . , K. The (normalized) sound pressure levels $S_k$ or gains $g_k$ are indicative of the directivity of the audio source 200. In particular, the sound pressure levels $S_k$ or gains $g_k$ may be considered to be sample points of a directivity pattern of the audio source 200 for the different incident directions $D_k$ 211, 221, 231.

The spatial directivity may be described or illustrated using a plurality of directivity points 310, 320, 330 (as illustrated in FIG. 3), wherein (for illustration purposes) the directivity points 310, 320, 330 are placed at different distances from the (previously determined) position of the audio signal 200. The directivity points 310, 320, 330 may be positioned around the position of the audio source 200. The distance between a directivity point 310, 320, 330 and the position of the audio source 200 may be indicative on how much energy of the audio signal is emitted from the audio source 200 towards the directivity point 310, 320, 330. In other words, the distance between a directivity point 310, 320, 330 and the position of the audio source 200 may be indicative of the sound pressure levels $S_k$ of sound emitted by the audio source 200 in the direction $D_k$ 211, 221, 231 of the directivity point 310, 320, 330. As such, a greater distance may indicate an increased sound pressure level $S_k$ (and vice versa). Hence, the directivity of the audio source 200 may be described or illustrated by a plurality of sample points 310, 320, 330, which are positioned in accordance to the energy and/or sound pressure level received by each microphone array 210, 220, 230 from the direction $D_k$ 211, 221, 231 of the estimated position of the audio source 200.

The distance of the directivity points 310, 320, 330 (as illustrated in FIG. 3) may correspond to a direction dependent gain $g_k$ which is applied to an omnidirectional, uniform audio source. An increased distance may correspond to an increased gain, and a reduced distance may correspond to a reduced gain. Hence, the directivity pattern 302 may define a direction dependent gain $g_k$ to be applied to an omnidirectional, uniform audio source. It should be noted that the distance of the directivity points 310, 320, 330 from the position of the audio source 200 (which is used to illustrate the directivity pattern 302) is different from the physical distance $d_k$ of the different microphone arrays 210, 220, 230 from the position of the audio source 200.

The directivity pattern 302 of an audio source 200 may be used to determine the sound perceived at different listening positions within a listening environment with increased precision.

Two or more energy or sound pressure level values for the audio source 200 may be determined based on the first and second microphone signals of the two or more microphone arrays 210, 220, 230, respectively. In other words, K energy or sound pressure level values (e.g. $E_k$) may be determined for the K sets of microphone signals at the K microphone arrays 210, 220, 230, respectively. The energy or sound pressure level value of a set of microphone signals may be determined e.g. based on the (average) energy or level of the microphone signals. The energy or sound pressure level values may be normalized, e.g. using the energy or level, notably the sum of or the average of the energy or level, of the K sets of microphone signals or using the energy or level of a selected one of the sets of microphone signals. The normalized energy or sound pressure level values may be used as direction dependent gains to be applied to an omnidirectional, uniform audio source.

The directivity pattern 302 of the audio source 200 may then be determined based on the K incident directions $D_k$ 211, 221, 231 and based on the K energy or sound pressure level values, e.g. the sound pressure levels $E_k$. Furthermore, the distances $d_k$ between the different microphone arrays 210, 220, 230 and the estimated position of the audio source 200 may be taken into account. In particular, the directivity pattern 302 may be determined such that a distance between a directivity point 310, 320, 330 and the position of the audio source 200 (as illustrated in FIG. 3) is indicative of the intensity or sound pressure level of sound emitted by the audio source 200 in the incident direction 211, 221, 231 of the directivity point 310, 320, 330. Hence, the directivity pattern 302 of an audio source 200 may be determined in a precise and efficient manner.

Determining a directivity pattern 302 of the audio source 200 may comprise determining two or more (captured) energy or sound pressure level values $E_k$ for the two or more microphone arrays 210, 220, 230 based on the first and second microphone signals of the two or more microphone arrays 210, 220, 230, respectively. In particular, the energy and/or sound pressure level $E_k$ of the sound captured at the different microphone arrays 210, 220, 230 may be determined, based on the microphone signals of the different microphone arrays 210, 220, 230, respectively.

Furthermore, two or more energy or sound pressure level values $S_k$ of sound emitted by the audio source 200 in the incident directions 211, 221, 231 of the two or more microphone arrays 210, 220, 230 may be determined based on the (captured) two or more energy or sound pressure level values $E_k$ and based on the respective distances $d_k$ between the two or more microphone arrays 210, 220, 230 and the position of the audio source 200, respectively. In particular, the (emitted) sound pressure level $S_k$ of sound emitted by the audio source 200 may be determined by multiplying the respective (captured) sound pressure level $E_k$ and the respective distance $d_k$. Sample points 310, 320, 330 of the directivity pattern 302 (which may be illustrated as directivity points as shown in FIG. 3) for the two or more incident directions 211, 221, 231 may then be determined based on the two or more (emitted) energy or sound pressure level values $S_k$, respectively.

Furthermore, determining a directivity pattern 302 of the audio source 200 may comprise normalizing the energy or sound pressure level values $S_k$ using the energy or sound pressure level value $S_1$ of the assigned microphone array 210, 220, 230. The sample points 310, 320, 330 of the directivity pattern 302 for the two or more incident directions 211, 221, 231 may then be determined based on the two or more normalized energy or sound pressure level values, e.g. $S_k/S_1$.

Furthermore, one or more sample points 310, 320, 330 that do not lie on a straight line between the position of an audio source 200 and the position of a microphone array 210, 220, 230 (i.e. sample points for directions other than the incident directions 211, 221, 231 of the microphone arrays 210, 220, 230) may be determined using an interpolation technique for interpolating between the sample points 310, 320, 330 for the two or more incident directions 211, 221, 231. The interpolation technique may make use of a linear combination of spherical harmonic functions 301. By doing this, a full (three-dimensional) directivity pattern 302 may be determined in an efficient and precise manner. The three-dimensional directivity pattern 302 may be used as direction dependent gains (scaled e.g. in the dB) to be applied to an omnidirectional, uniform audio source.

As indicated above, the directivity pattern 302 may be approximated using a linear combination of spherical harmonic functions 301. The best combination of spherical harmonic functions 301 may be determined using an optimization process (e.g. a gradient descent process). In particular, the combination of spherical harmonic functions 301 may be determined to best fit the known directivity sample points 310, 320, 330. By way of example, an average (squared) deviation of the combination of spherical harmonic functions 301 from the sample points 310, 320, 330 may be determined and minimized for determining an optimal combination of spherical harmonic functions 301.

Hence, determining the directivity pattern 302 may comprise determining, notably reducing or minimizing, a (possibly squared) distance between approximated sample points of the directivity pattern 302 for the two or more incident directions 211, 221, 231 approximated by a linear combination of spherical harmonics functions 301 and the (actual) sample points 310, 320, 330 of the directivity pattern (302) for the two or more incident directions 211, 221, 231.

Figure 8:
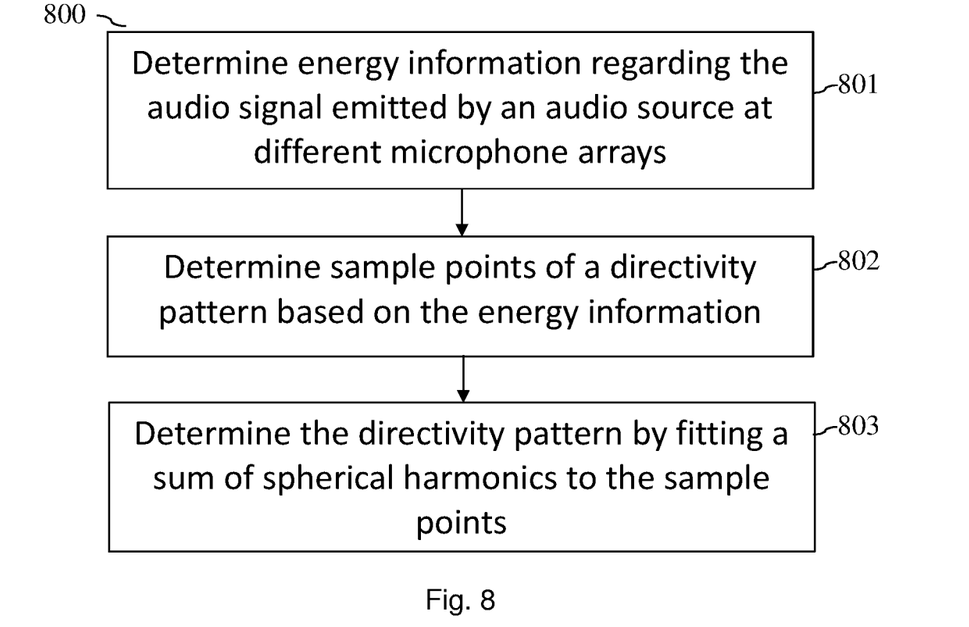
FIG. 8 shows a flow chart of an exemplary method for determining a directivity pattern of an audio source.

FIG. 8 shows a flow chart of an exemplary method 800 for determining a directivity pattern of an audio source (e.g., a directivity pattern 302 for an audio source 200). In one example, method 800 may be performed in accordance with the principles described in connection with block 605 shown in FIG. 6. The method 800 comprises, at 801, determining energy information (e.g. an energy value and/or a sound pressure level) of the audio signal emitted by the audio source 200 at the K different microphone arrays 210, 220, 230. In other words, energy information regarding the microphone signals captured by the K different microphone arrays 210, 220, 230 may be determined. Furthermore, the method 800 comprises, at 802, determining sample points 310, 320, 330 of a directivity pattern 302 based on the energy information. For this purpose, the energy information (e.g. the energy values and/or the sound pressure levels) may be normalized as outlined above. In addition, the method 800 comprises, at 803, determining the (approximated) directivity pattern 302 of the audio source 200 based on the sample points 310, 320, 330. In particular, a sum of spherical harmonics 301 may be fitted to the sample points 310, 320, 330 to determine the directivity pattern 302.

The gains $g_k=S_k/S_1$, for $k=1, \ldots, K$, and/or gains indicated by the approximated directivity pattern 302 of an audio source 200 may be used during playback time to generate a listening (ie., rendered) signal for the signal emitted by the audio source 200. This listening signal may indicate how a listener positioned at a particular listening position perceives the signal emitted by the audio source 200. Hence, the gains of the directivity pattern 302 may be used to reconstruct the signal emitted by the audio source 200 at different listening positions around the audio source 200.

As such, the method 700 may be used to determine the position and the directivity pattern 302 of N different audio sources 200. Furthermore, the method 700 may include the step of determining an audio signal for an audio source 200, notably the step of determining N audio signals for N different audio sources 200. For this purpose, the method 700 may include assigning the first and/or second microphone signals of one of the two or more microphone arrays 210, 220, 230 to an audio source 200 based on the two or more energy values 310, 320, 330. In particular, the set of microphone signals having the highest energy value may be assigned to an audio source 200. The audio signal which is emitted by the audio signal 200 may then be determined using a single set of microphone signals (notably the set of microphone signals having the highest energy value). By doing this, high quality audio signals may be assigned to an audio source 200.

As outlined above, the processing may be performed on a subband basis for determining the position and/or the directivity patterns 302 for N different audio sources 200. In a corresponding manner, the energy values of the K different sets of subband signals may be compared to select a set of subband signals for a particular audio source 200.

The first and second microphone signals of the two or more microphone arrays 210, 220, 230 may be divided into a sequence of frames having a frame duration (e.g. of 20 ms or less). The position, the directivity pattern 302 and/or the audio signal of an audio source 200 may be determined for each frame from the sequence of frames. By doings this, moving audio sources 200 may be tracked in a precise manner.

As outlined above, the audio signal emitted by an audio source 200 may be determined based on the first and second microphone signals of the two or more microphone arrays 210, 220, 230. In particular, the method 700 may allow determining the position, the directivity pattern 302 and/or the audio signal of an audio source 200 only using the microphone signals captured by K differently positioned microphone arrays 210, 220, 230. This information may be used to generate an audio representation independent of the listening position. This audio representation can be re-rendered for a listener at an arbitrary listening position within the three-dimensional (3D) environment. In particular, the determined audio signal, the determined position and/or the determined directivity pattern 302 of an audio source 200 may be used to determine how a listener perceives the audio signal emitted by the audio source 200 at an arbitrary listening position within the 3D environment. Hence, an efficient and precise audio representation scheme (e.g., for VR applications) is provided.

Indirect components may be determined from the first microphone signal and from the second microphone signal of a microphone array 210, 220, 230. The audio representation may also include the indirect components of one or more microphone arrays 210, 220, 230. For generating these indirect components of the audio representation, the indirect components of a microphone array 210, 220, 230 may be assumed to be originating from a position which is associated with the position of the microphone array 210, 220, 230. By way of example, the virtual source of the indirect components of a microphone array 210, 220, 230 may correspond to or may be equal to the position of the microphone array 210, 220, 230. By taking into account the indirect components when generating an audio representation, the perceived quality of the audio representation may be improved.

Any of the features described in the present document may be part of a corresponding system for determining the position of at least one audio source 200. The system may comprise a processor for performing the method steps outlined in the present document. In particular, the system may be adapted to capture first and second microphone signals at two or more microphone arrays 210, 220, 230, wherein the two or more microphone arrays 210, 220, 230 are placed at different positions. The two or more microphone arrays 210, 220, 230 may each comprise at least a first microphone capsule to capture a first microphone signal and a second microphone capsule to capture a second microphone signal. Furthermore, the first and second microphone capsules may exhibit differently oriented spatial directivities.

The system may be further adapted to determine, for each microphone array 210, 220, 230 and based on the respective first and second microphone signals, an incident direction 211, 221, 231 of (the sound emitted by) at least one audio source 200 at the respective microphone array 210, 220, 230. Furthermore, the system may be adapted to determine the position of the audio source 200 based on the incident directions 211, 221, 231 at the two or more microphone arrays 210, 220, 230.

Figure 9:
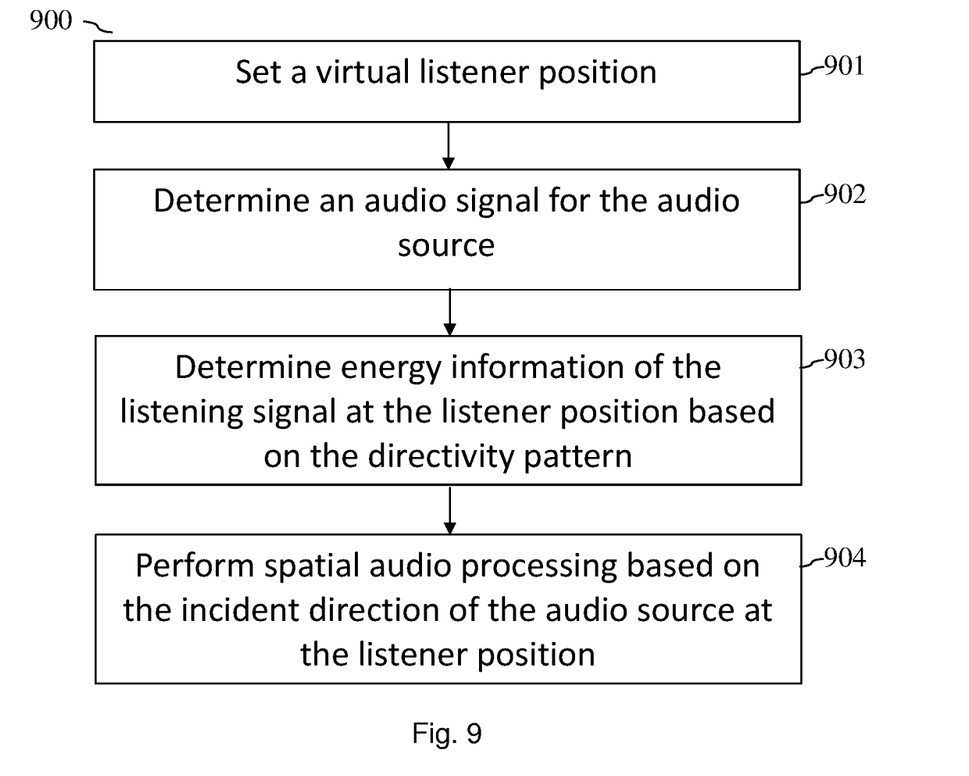
FIG. 9 shows a flow chart of an exemplary method for determining a listening signal at a virtual listener position.

FIG. 9 shows a flow chart of an example method 900 for determining a listening signal for an audio source 200. In one example, method 900 may be performed subsequent to block 606 shown in FIG. 6. A listening signal may be determined for each audio source 200 within a rendering environment (e.g. for each subband). The audio source signals may be provided by block 606 of method 600 shown in FIG. 6. The overall listening signal may then be determined by overlaying the listening signals for the different audio sources 200 (e.g. for the different subbands).

The method 900 comprises, at 901, setting or determining a virtual listener position for a listener. The virtual listener position may be placed at a certain distance d from the position of the audio source 200. Furthermore, the virtual listener position may exhibit a certain virtual incident direction with respect to the position of the audio source 200. The method 900 further comprises, at 902 determining an audio signal for the audio source 200 (e.g. using the above mentioned schemes). For example, at 902 the core audio information from method 600 of FIG. 6 may be utilized to determine the audio signal. In addition, the method 900 comprises, at 903, determining energy information of the listening signal at the virtual listener position based on the directivity pattern 302 of the audio source 200. For example, at 903, the directivity from method 600 of FIG. 6 may be utilized to determine the energy information. In particular, the energy value and/or the sound pressure level of the audio signal emitted by the audio source 200 at the virtual listener position may be determined based on the directivity pattern 302 and based on the distance d of the virtual listener position from the position of the audio source 200. In particular a 1/d gain may be applied to the audio signal emitted by the audio source 200.

Furthermore, the method 900 comprises, at 904, performing spatial audio processing (e.g. binaural processing) of the mono audio signal emitted by the audio source. For example, at 904, the position from method 600 of FIG. 6 may be utilized to perform the spatial audio processing. For this purpose, the virtual incident direction of the audio signal at the virtual listener position may be taken into account. Using spatial audio processing, a listener at the virtual listener position may be enabled to perceive the listening signal as coming from the virtual incident direction. The spatialized listening signal for the audio signal emitted by the audio source 200 may then be rendered to a listener (e.g. in combination with other listening signals for other audio sources 200). The method 900 may then output the spatialized signal (e.g., in stereo or multi-channel format). The spatialized signal may be formatted to be played back on either speakers or binaurally over headphones.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The methods and systems described in the present document may be implemented as software, firmware and/or hardware. Certain components may e.g. be implemented as software running on a digital signal processor or microprocessor. Other components may e.g. be implemented as hardware and/or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

What is claimed is:

1. A method for determining an audio representation of at least one audio source, the method comprising:
   receiving first and second microphone signals at two or more microphone arrays, wherein the two or more microphone arrays are placed at different positions, wherein the two or more microphone arrays each comprise at least a first microphone capsule to capture a first microphone signal and a second microphone capsule to capture a second microphone signal,
   wherein the first and second microphone capsules have differently oriented spatial directivities;
   determining, for each microphone array and based on the respective first and second microphone signals, an incident direction of at least one audio source at the respective microphone array;
   determining the position of the audio source based on the incident directions at the two or more microphone arrays;
   determining a directivity pattern of the audio source based on the first and second microphone signals of the two or more microphone arrays and based on the position of the audio source, wherein the directivity pattern is constructed by spherical harmonics;
   determining a core mono audio signal; and
   determining an audio representation based on the position of the audio source, the core mono signal and the directivity pattern;
   wherein determining the directivity pattern of the audio source further comprises:
   determining two or more energy or sound pressure level values $E_k$ for the two or more microphone arrays based on the first and second microphone signals of the two or more microphone arrays;
   determining two or more energy or sound pressure level values $S_k$ of sound emitted by the audio source in the directions of the two or more microphone arrays based on the two or more energy or sound pressure level values $E_k$ and based on respective distances $d_k$ between the two or more microphone arrays and the position of the audio source;
   determining sample points of the directivity pattern for the two or more incident directions based on the two or more energy or sound pressure level values $S_k$, wherein one or more sample points of the directivity pattern that do not lie on a straight line between the position of the audio source and the position of the microphone array are determined using an interpolation technique for interpolating between the sample points for the two or more incident directions; and
   the interpolation technique comprises a linear combination of spherical harmonics functions.

2. The method of claim 1, wherein the method comprises determining an inter-channel level difference and an inter-channel time difference based on the first microphone signal and based on the second microphone signal of a microphone array; and
   determining the incident direction at the microphone array based on the inter-channel level difference and based on the inter-channel time difference.

3. The method of claim 1, wherein the incident direction at a microphone array is indicative of an azimuth angle and of an elevation angle of a straight line between the position of the microphone array and the position of the audio source.

4. The method of claim 1, wherein the method further comprises:
   determining direct components and indirect components from the first microphone signal and from the second microphone signal of a microphone array; and
   determining the incident direction at the microphone array based on the direct components.

5. The method of claim 4, wherein the direct components are determined based on a correlation between the first microphone signal and the second microphone signal.

6. The method of claim 1, wherein the method further comprises:
   determining N first subband signals from the first microphone signal of a microphone array, with N>1;
   determining N second subband signals from the second microphone signal of the microphone array, wherein the N first and second subband signals correspond to N different subranges of an overall frequency range of the first and second microphone signals; and
   determining N incident directions of N different audio sources at the microphone array, based on the N first and second subband signals, respectively.

7. The method of claim 1, wherein the first and second microphone signals are captured at K microphone arrays, with K>1,
   wherein K incident directions for the K microphone arrays are determined for the audio source; and
   determining the position of an audio source comprises, determining an angular distance based on reducing a cost function which is indicative of an average distance of the position of the audio source from K straight lines originating from the K positions of the K microphone arrays at the K incident directions, respectively.

8. The method of claim 1, further comprising determining two or more energy or sound pressure level values for the audio source based on the first and second microphone signals of the two or more microphone arrays, respectively; and
   the directivity pattern of the audio source is determined based on the two or more incident directions and based on the two or more energy or sound pressure level values.

9. The method of claim 8, wherein the method comprises assigning the first and/or second microphone signals of one of the two or more microphone arrays to the audio source based on the two or more energy or sound pressure level values.

10. The method of claim 1, wherein
    the directivity pattern is indicative of a plurality of directivity points around the audio source;
    the directivity pattern is determined such that a distance between a directivity point and the position of the audio source is indicative of the intensity or sound pressure level of sound emitted by the audio source in the direction of the directivity point.

11. The method of claim 1, wherein determining the directivity pattern of the audio source comprises normalizing the energy or sound pressure level values $S_k$ using the energy or sound pressure level value $S_1$ of the assigned microphone array;
determining sample points of the directivity pattern for the two or more incident directions based on the two or more normalized energy or sound pressure level values $S_k$.

12. The method of claim 11, wherein determining the directivity pattern comprises determining, reducing, a distance between approximated sample points of the directivity pattern for the two or more incident directions approximated by a linear combination of spherical harmonics functions and the sample points of the directivity pattern for the two or more incident directions.

13. The method of claim 1, wherein
the first and second microphone signals of the two or more microphone arrays are divided into a sequence of frames having a frame duration; and
the position of the audio source is determined for each frame from the sequence of frames.

14. The method of claim 13, wherein each microphone array comprises
an XY microphone array comprising a first microphone capsule and a second microphone capsule which are configured to capture sound at different angles; and/or
a B format microphone.

15. The method of claim 1, wherein the method further comprises
determining an audio signal emitted by the audio source based on the first and second microphone signals of the two or more microphone arrays; and
determining a listening signal for a listener at a listening position based on the determined audio signal and based on the determined position of the audio source.

16. The method of claim 15, wherein the method comprises
determining indirect components from the first microphone signal and from the second microphone signal of a microphone array; and
determining the listening signal also based on the indirect components originating from a position associated with the position of the microphone array.

17. A system for determining the position of at least one audio source, wherein the system is configured to:
capture first and second microphone signals at two or more microphone arrays, wherein the two or more microphone arrays are placed at different positions, wherein the two or more microphone arrays each comprise at least a first microphone capsule to capture a first microphone signal and a second capsule to capture a second microphone signal, wherein the first and second microphone capsules have differently oriented spatial directivities;
determine, for each microphone array and based on the respective first and second microphone signals, an incident direction of at least one audio source at the respective microphone array;
determine the position of the audio source based on the incident directions at the two or more microphone arrays;
determine a directivity pattern of the audio source based on the first and second microphone signals of the two or more microphone arrays and based on the position of the audio source, wherein the directivity pattern is constructed by spherical harmonics;
determine a core mono audio signal; and
determine an audio representation based on the position of the audio source, the core mono signal and the directivity pattern;
wherein determining the directivity pattern of the audio source further comprises:
determine two or more energy or sound pressure level values $E_k$ for the two or more microphone arrays based on the first and second microphone signals of the two or more microphone arrays;
determine two or more energy or sound pressure level values $S_k$ of sound emitted by the audio source in the directions of the two or more microphone arrays based on the two or more energy or sound pressure level values $E_k$ and based on respective distances $d_k$ between the two or more microphone arrays and the position of the audio source;
determine sample points of the directivity pattern for the two or more incident directions based on the two or more energy or sound pressure level values $S_k$, wherein one or more sample points of the directivity pattern that do not lie on a straight line between the position of the audio source and the position of the microphone array are determined using an interpolation technique for interpolating between the sample points for the two or more incident directions; and
the interpolation technique comprises a linear combination of spherical harmonics functions.

* * * * *